United States Patent [19]
Vincent

[11] Patent Number: 5,050,077
[45] Date of Patent: Sep. 17, 1991

[54] MEETING SCHEDULAR WITH ALTERNATIVE LISTING

[75] Inventor: James P. Vincent, Arlington, Tex.

[73] Assignee: International Business Machines Corporation, Armonk, N.Y.

[21] Appl. No.: 551,687

[22] Filed: Jul. 9, 1990

Related U.S. Application Data

[63] Continuation of Ser. No. 406,890, Sep. 12, 1989, abandoned, which is a continuation of Ser. No. 153,111, Feb. 8, 1988, abandoned.

[51] Int. Cl.$^5$ ............................................. G06F 15/21
[52] U.S. Cl. .................................................... 364/401
[58] Field of Search ......................................... 364/401

[56] References Cited

U.S. PATENT DOCUMENTS 4,626,836  12/1986  Curtis et al. ...................... 340/706

FOREIGN PATENT DOCUMENTS 142067  10/1984  European Pat. Off. .

OTHER PUBLICATIONS

IBM Technical Disclosure Bulletin, vol. 29, No. 4, Sep. 1986, p. 1633, New York, U.S.; "Highlight Users Blocking the Meeting When Searching".

Vincent, J. P. et al., IBM Technical Disclosure Bulletin, vol. 26, No. 12, May 1984, p. 6654, New York, U.S.; "Conditionally Scheduling Events By Computer".

"AMS Automated Meeting Scheduling 2.2", International Project Management Inc., Upton, Mass., Dec. 1984.

Godwin, N., "Agency, Funded by 3M, Set to Market Software: Travelmation Touts Trip Planner to Corporations", *Travel Weekly*, Oct. 13, 1986.

Godwin, N., "Agency Dares to Launch its Own Air Res System", *Travel Weekly*, Oct. 23, 1986, 2 pages.

Kikuno, T. et al., "Scheduling of Meetings in Office Information Systems", Proceedings of COMPSAC 82, IEEE Computer Society's Sixth International Computer Software and Applications Conference, Nov. 1982, 318-25.

Chappell, B., "Meeting Scheduler", *Microcomput. Printout (GB)*, vol. 3, No. 12, Nov. 1982, 72-4.

Noller, D. G., "Program Gives Best Choice for Scheduling Meetings", *Industrial Engineering*, vol. 16, No. 1, Jan. 1984, 24, 25, 27, 28, 30 and 32.

Primary Examiner—Clark A. Jablon
Attorney, Agent, or Firm—Andrew J. Dillon

[57] ABSTRACT

An improved method of scheduling a meeting among terminal users who are provided with calendaring applications for storing and retrieving times and dated events. A prompting screen is presented to a meeting scheduler with blanks for keying in desired times, dates, and prospective attendees for a meeting. In response to the schedulers keying to this screen, a comparison is made with the calendar of events for each prospective attendee. As a result of the nonavailability of a meeting time which complies with the desired times, dates and attendees, certain of these factors are automatically altered or "relaxed" in order to achieve an acceptable meeting time. An option list of meeting times is then presented to the scheduler for selection of a meeting time. Based upon the selection of the scheduler, a meeting notification screen is then constructed for transmittal to each attendee.

7 Claims, 5 Drawing Sheets

```
                         MEETING OPTION LIST
SEARCHED FROM THIS DATE: 09/09/87
TO THIS DATE:            09/11/87
AMOUNT OF TIME NEEDED: HOURS 2 MINUTES 30
IT IS NOT POSSIBLE TO MEET ALL SCHEDULE PARAMETERS.
A LIST OF ALTERNATIVE SOLUTIONS FOLLOWS :
TO CHOOSE A DAY AND TIME, TYPE X NEXT TO YOUR CHOICE BELOW,
CHANGE THE STARTING AND ENDING TIMES AS REQUIRED AND PRESS ENTER.

CHOICE  DAY         DATE        STARTING    ENDING      DEFICIENCY
  _     WEDNESDAY   09/09/87    10:00 AM    12:00 AM    TIME
  _     WEDNESDAY   09/09/87     1:30 PM     5:00 PM    ATTENDEE- SMITH
  _     THURSDAY    09/10/87    10:30 AM     6:00 PM    ATTENDEE- JONES
  _     FRIDAY      09/11/87     8:30 AM    10:45 AM    TIME
  _     FRIDAY      09/11/87     2:00 PM     5:15 PM    ATTENDEE - JOHNSON

SCREEN   1 OF 1
PF1 TRY ANOTHER  PF9 HELP  PF10 NEXT SCREEN  PF11 PREVIOUS SCREEN  PF12 RETURN

1...+...10....+...20....+...30....+...40....+...50....+...60....+...70....+...80
```

```
                        SCHEDULE A MEETING
TYPE IN THE INFORMATION BELOW.

SEARCH FROM THIS DATE:  9 / 9 / 87
   TO THIS DATE:           9 / 11 / 87
   AMOUNT OF TIME NEEDED:  HOURS  2 MINUTES 30

CHECK THE FOLLOWING SCHEDULES.   TYPE ONE CONFERENCE ROOM NAME AND/OR
   USER NAME PER SPACE.  WHEN YOU HAVE FINISHED, PRESS ENTER.
      SMITH   __________________    BROWN  __________________
      JONES   __________________    CONFERENCE ROOM A22_______
      JOHNSON __________________    __________________________
              __________________    __________________________
              __________________    __________________________
              __________________    __________________________
              __________________    __________________________
              __________________    __________________________
              __________________    __________________________

PF9 HELP    PF12 RETURN
1...+...10....+...20....+...30....+...40....+...50....+...60....+...70....+...80
```

*Fig. 1*

```
                        MEETING OPTION LIST
SEARCHED FROM THIS DATE:  09 / 09 / 87
TO THIS DATE:             09 / 11 / 87
AMOUNT OF TIME NEEDED: HOURS  2  MINUTES  30
IT IS NOT POSSIBLE TO MEET ALL SCHEDULE PARAMETERS.
A LIST OF ALTERNATIVE SOLUTIONS FOLLOWS :
TO CHOOSE A DAY AND TIME, TYPE X NEXT TO YOUR CHOICE BELOW,
CHANGE THE STARTING AND ENDING TIMES AS REQUIRED AND PRESS ENTER.

CHOICE  DAY          DATE          STARTING    ENDING     DEFICIENCY
     _     WEDNESDAY    09/09/87      10:00 AM    12:00 AM   TIME
     _     WEDNESDAY    09/09/87      1:30 PM     5:00 PM    ATTENDEE - SMITH
     _     THURSDAY     09/10/87      10:30 AM    6:00 PM    ATTENDEE - JONES
     _     FRIDAY       09/11/87      8:30 AM     10:45 AM   TIME
     _     FRIDAY       09/11/87      2:00 PM     5:15 PM    ATTENDEE - JOHNSON

SCREEN    1 OF 1
PF1 TRY ANOTHER  PF9 HELP  PF10 NEXT SCREEN  PF11 PREVIOUS SCREEN  PF12 RETURN
1...+...10....+...20....+...30....+...40....+...50....+...60....+...70....+...80
```

*Fig. 2*

```
                SEND A NOTICE OF A MEETING
DATE TO BE SCHEDULED:   9/11/87
STARTING TIME:          2:00 PM
ENDING TIME:            5:15 PM

TYPE IN THE INFORMATION BELOW. THEN, PRESS PF7 TO SEND.

LOCATION:   THIRD FLOOR CONFERENCE ROOM (A22)___________________
           _____________________________________________________

PURPOSE:   WE NEED TO REVIEW THAT JANUARY SALES REPORT TO SEE IF WE NEED A__
           NEW APPROACH FOR OUR FORTHCOMING PRODUCT. PLEASE BRING YOUR ___
           MONTHLY REPORTS FOR THE LAST YEAR, AND THE FORECAST FOR THIS__
           YEAR.__________________________________________________
           _______________________________________________________
           _______________________________________________________
           _______________________________________________________
           _______________________________________________________

PF1 TRY ANOTHER   PF2 CHANGE TIME   PF7 SEND   PF9 HELP   PF12 RETURN

MEETING SCHEDULAR WITH ALTERNATIVE LISTING

This application is a continuation of application Ser. No. 07/406,890, filed Sept. 12, 1989 abandoned, which is a continuation of application Ser. No. 07/153,111, filed Feb. 8, 1988, abandoned.

BACKGROUND OF THE INVENTION

1. Technical Field

This invention relates in general to meeting scheduling, and more particularly, to methods for generating alternative meeting schedules when desired meeting parameters cannot be met.

2. Background Art

Scheduling of meetings has always been fraught with problems. This is particularly the case when one scheduling a meeting, or meeting scheduler, has no management or other control over those whose attendance is either desired or necessary.

The prior art initially eased the scheduling burden in that keyboard/display terminal users' schedules were stored in varying calendar forms, and all could be available for call-up at each terminal. These schedules could be called and scanned to determine common available times. This was extremely time consuming if schedules were only available in narrative form on a day-at-a-time basis. Even when monthly abbreviated schedules or calendars were available for call-up, mental or pencil and paper notation of available times was both error-prone and no minor chore.

The prior art has now gone further in solving the above noted problems. Calendar application programs, stored in a host computer to which the terminal users are connected, are able to read calendars of prospective attendees and provide a listing of available meeting times and dates. The available times and dates are derived from date and time ranges provided by the scheduler. From this listing, a meeting scheduler can select a suitable time and date. After making a selection, and either writing down or making a mental note of the suitable time and date, the meeting scheduler can key and transmit a message to each attendee. These systems still require excessive keying in terms of rekeying attendees' names, and a meeting time and date.

More recently, a technique has been developed which presents available meeting times and dates to a meeting scheduler as an option screen. The option screen is then keyed in order to select a time and date for the meeting. When utilizing this technique, a notification screen is presented to the scheduler after selection from the option screen. The scheduler then keys into the notification screen filling in the purpose and location of the meeting and, if appropriate, shortening the duration of the meeting. Upon completing the notification screen, the screen is then transmitted to notify all attendees of the meeting. While this system represents an advance in time savings, error reduction, and reduced keying requirements, it does not address the problem which occurs when a meeting time cannot be determined which complies with all of the required parameters as determined by the scheduler.

Therefore, it should be apparent that a need exists for a meeting scheduling method which will accommodate situations in which all of the desired meeting parameters cannot be met.

SUMMARY OF THE INVENTION

It is therefore one object of the present invention to provide an improved method of scheduling meetings.

It is another object of the present invention to provide an improved method of scheduling meetings which permits an operator to select desired times, dates and attendees and automatically determines appropriate meeting times.

It is yet another object of the present invention to provide an improved method of scheduling meetings which permits an operator to select desired times, dates and attendees and automatically determines appropriate meeting times despite the nonavailability of a meeting time which complies with all of the operator's requirements.

The foregoing is achieved as is now described. A prompting screen is provided to a meeting scheduler with blanks for keying in desired times, dates and prospective attendees for a meeting. In response to the keying to this screen, a comparison is made with the calendar of events for each prospective attendee. As a result of the nonavailability of a meeting time which complies with the desired times, dates, and attendees, these factors are "relaxed" in order to achieve an acceptable meeting time. An option list of meeting times is then presented to the scheduler for selection of a meeting time. Based upon the selection of the scheduler, a meeting notification screen is constructed for transmittal to the attendees.

BRIEF DESCRIPTION OF THE DRAWINGS

The novel features believed characteristic of the invention are set forth in the appended claims. The invention itself; however, as well as a preferred mode of use, further objects and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
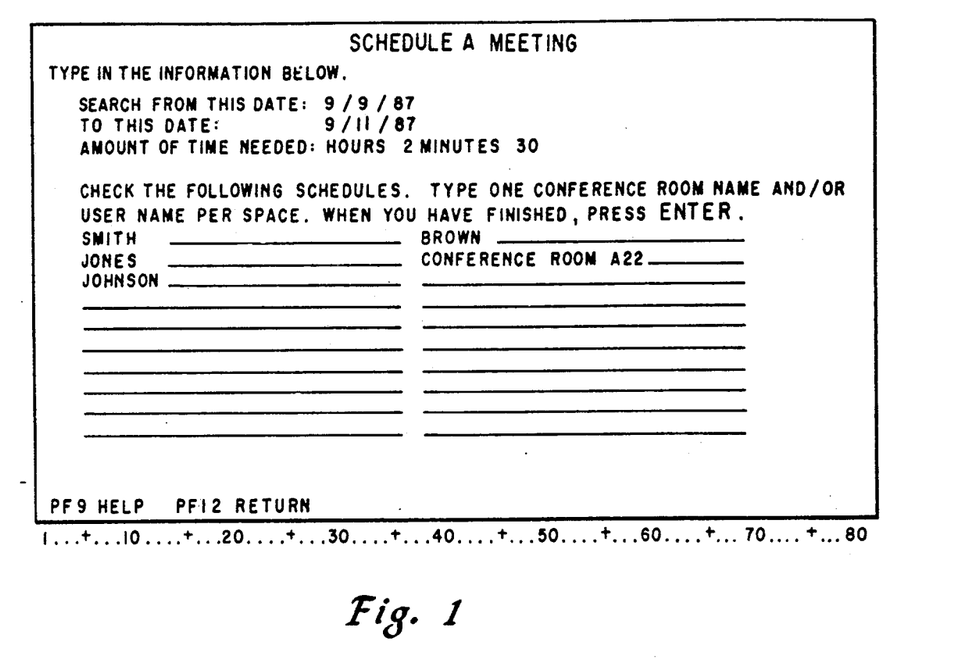
FIG. 1 is a pictorial representation of a prompting screen which is presented to a meeting scheduler at the beginning of the scheduling method of the present invention.

With reference now to the Figures and in particular with reference to FIG. 1, there is depicted a pictorial representation of a prompting screen which is presented to a meeting scheduler at the beginning of the scheduling method of the present invention. Those skilled in the art will appreciate that the terms "meeting scheduler", "scheduler", "operator", and "user" are utilized interchangably throughout the specification to refer to an individual utilizing the present invention. This prompting screen is the initial screen called by, and presented to a keyboard/display terminal operator who desires to schedule a meeting. The operator keys in the desired dates between which the meeting is to be scheduled, a minimum amount of time for the meeting, and a list of prospective attendees.

Upon completion of keying to the prompting screen of FIG. 1, the user then depresses the ENTER key. This causes the contents of the prompting screen to be compared with each prospective attendee's schedule. The keyboard/display terminals contemplated for use in the present invention are generally connected via land lines, hard wiring or other means to a host system having processing, storage, and retrieval capabilities. Configurations of this nature are old and well known in the art, with the most common display technique being a CRT display. Stored in the host system storage are schedules or calendars of events for all terminal users. These schedules are prepared and changed by each user as necessary.

Figure 2:
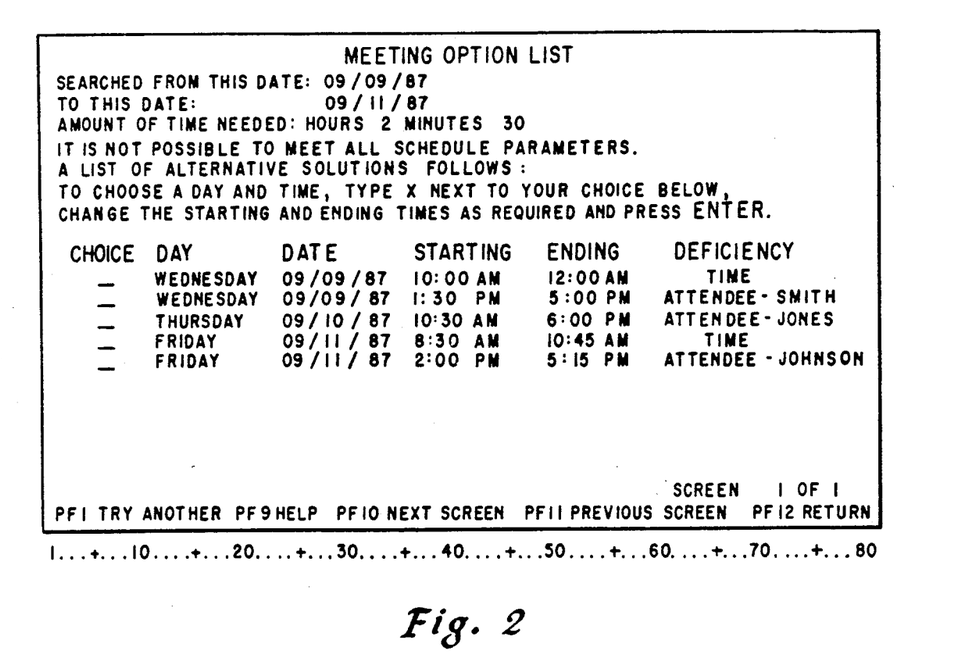
FIG. 2 is a pictorial representation of an option list of nominal meetings scheduled in accordance with the present invention.

The results of a comparison between the contents of the prompting screen and the prospective attendees' schedules are available dates and meeting times where the parameters entered by the operator can be met. In known scheduling systems, these meeting times can be presented to the operator as an option list. However, in the event that no meeting time is available which meets the operator's meeting parameters the present invention permits a variety of meeting options to be presented to the operator on a meeting option list as shown in FIG. 2. As can be seen, each meeting option listed within FIG. 2 includes a deficiency wherein one parameter selected by the operator cannot be met. In accordance with the present invention, the operator may then select a nominal solution by keying in a choice on the option screen depicted in FIG. 2.

In a preferred embodiment of the present invention, the date and time ranges and spans desired by the operator and keyed into the prompting screen of FIG. 1 are also shown on the meeting option list screen of FIG. 2 as a reference. In the event the operator desires to alter any of the parameters selected, the prompting screen can be recalled by pressing a programmable function key on the keyboard.

In the event the meeting option list is too long to display on the operator's display screen, programmable function keys may be utilized to scroll the list. To elect a date and time from the list presented, the operator keys in an "X" under the column labeled "CHOICE" next to the date and time desired. In the event the time interval depicted is longer than that desired by the operator, a different starting and/or ending time for the meeting may also be keyed in.

Figure 3:
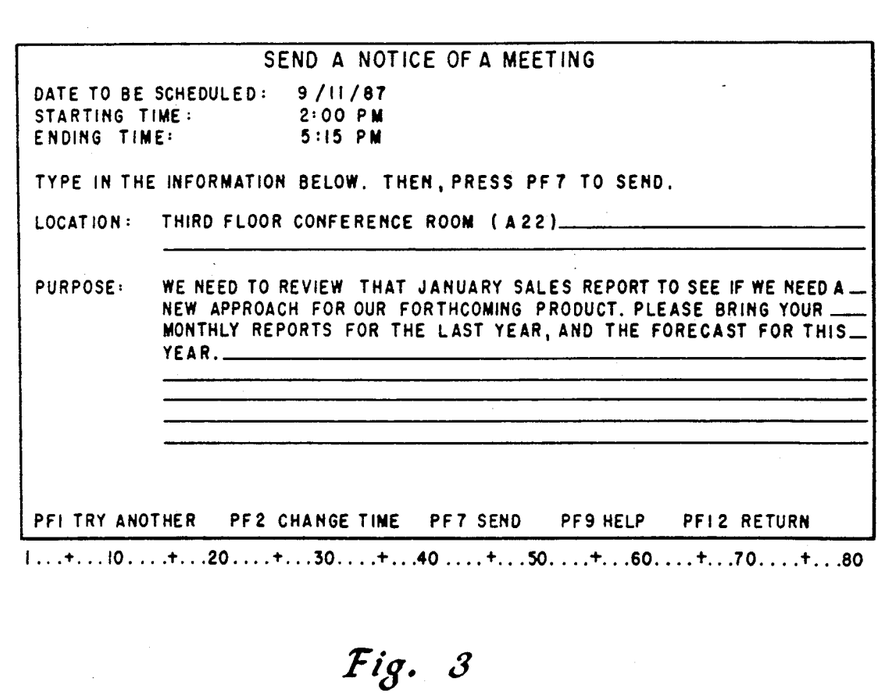
FIG. 3 is a pictorial representation of a meeting notification screen constructed in accordance with the present invention.

Once the operator has elected an option and depressed the ENTER key on the keyboard, a notification screen is then preferably called and displayed in order to prompt the operator to key in the location and purpose of the meeting. One notification screen suitable for utilization with the present invention is depicted in FIG. 3. The date, starting time, and ending time chosen by the operator from the screen of FIG. 2 is depicted for the operator on the screen depicted in FIG. 3, as a reference. If a different date and/or time from the list is then desired, a programmable function key can be depressed for recalling, or causing a return to, the meeting option list of FIG. 2.

In the event new meeting parameters are desired, a different programmable function key may be utilized to restart the entire operation beginning with the prompting screen of FIG. 1. Once the location and/or purpose of the meeting have been keyed in on the screen of FIG. 3, a third programmable function key may be depressed to send or transmit notification of the meeting to each of the prospective attendees which were keyed in on the prompting screen depicted in FIG. 1.

Figure 4:
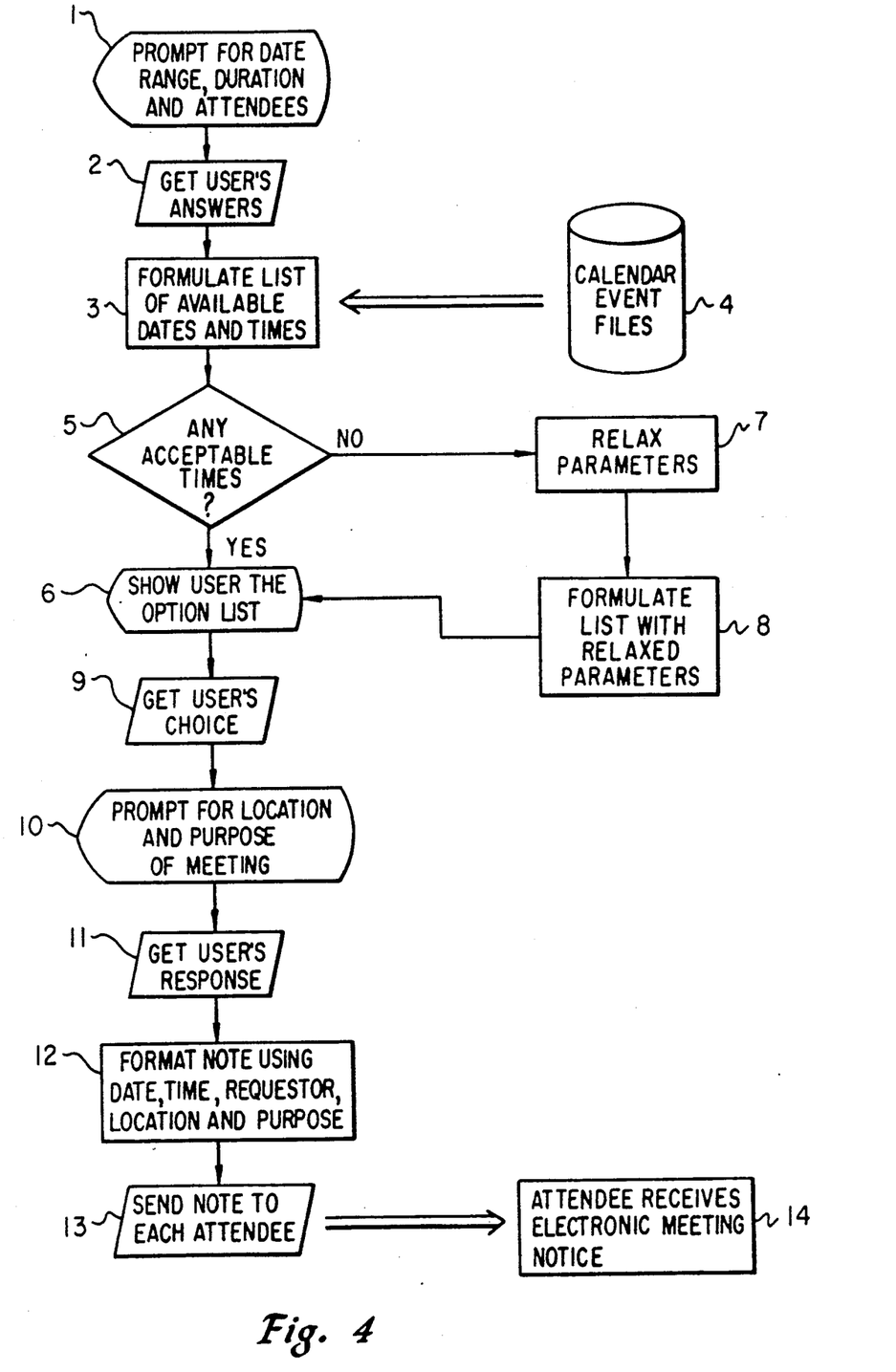
FIG. 4 depicts a flow diagram of the software operations performed in scheduling a meeting in accordance with the present invention.

With reference now to FIG. 4, there is depicted a flow diagram of the software operations performed in scheduling a meeting in accordance with the present invention. First, based upon operator keyboard entries, the prompting screen depicted in FIG. 1 is called as indicated by block 1. Next, data keyed into the screen of FIG. 1, illustrated by block 2, is utilized to compile a list of available meeting dates and times, as illustrated by block 3. One manner of compiling such a list is disclosed in greater detail below. This list of available dates and times is a result of a comparison of a filled in prompting screen with the attendees' calendar event files which are stored in host memory, as indicated in block 4. Decision block 5 is then utilized to determine whether or not there exist any dates and times which meet each of the parameters specified by the operator.

In the event that an acceptable date and time exist, a resultant list of all such dates and times is displayed to the operator as a meeting option list from which a specific meeting time may be chosen. This activity is depicted by block 6.

Once the operator has elected a particular meeting date and time, as indicated by block 9, the program logic assembles and displays to the user the notification screen of FIG. 3, as represented by block 10. After the operator has keyed in the requested data as indicated by block 11, the program logic builds a notification screen which informs each recipient of the date, time, requester, location, and purpose of the meeting. This building process is performed by the logic as indicated by block 12. The notification is then transmitted from the host computer to each prospective attendees' display, as indicated by block 13. Block 14 to indicates the receipt of a meeting notification by each attendee.

Referring once again to decision block 5, in the event that no acceptable meeting date and time complies with the parameters specified by the operator, the parameters are then automatically "relaxed", as indicated by block 7. Thereafter, a list of dates and times which complies with the relaxed parameters is displayed as a meeting option list, as indicated by block 6. Thereafter, the operation of the program logic is as discussed above.

Figure 5:
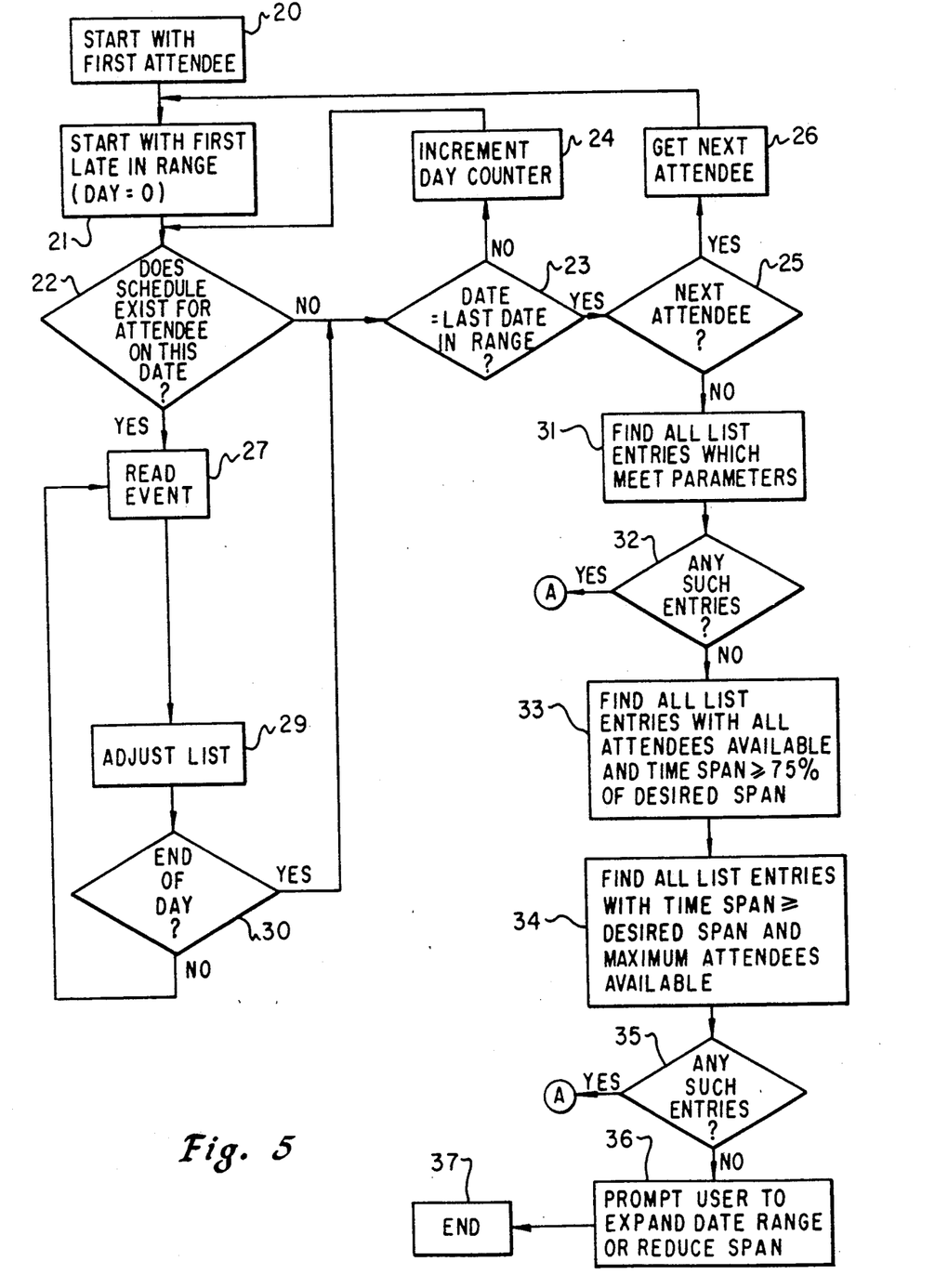
FIG. 5 and 6 illustrate in greater detail the operations of blocks 3-8 of FIG. 4.
Figure 6:
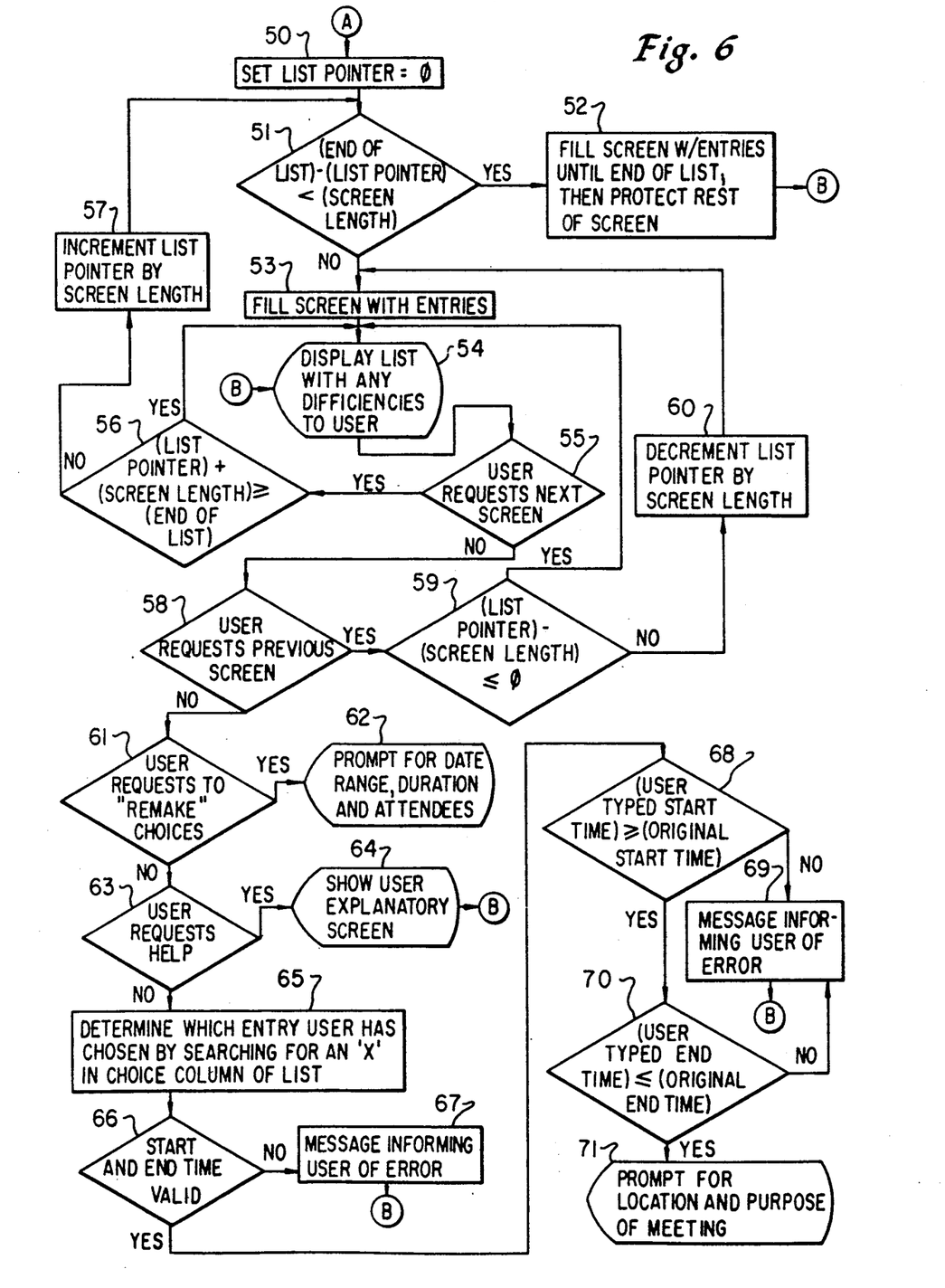

With reference now to FIGS. 5 and 6, there is illustrated in greater detail the operation of blocks 3-8 of FIG. 4. First, as indicated in block 20, the formulation of a list of available dates and times starts with an analysis of the calendar files of the first prospective attendee. Next, the first date in the range of dates specified by the operator is located within the calendar event files of the host computer. The day counter is initialized and the existence of a schedule for the first attendee on this particular date is determined, as depicted in blocks 21 and 22. In the event that a schedule does not exist for this particular attendee on the selected date, decision block 23 is utilized to determine whether or not the current date is equal to the last date in the range specified by the operator. If not, logic block 24 is utilized to increment the day counter and the program logic returns to decision block 22 to determine whether or not a schedule exists for this attendee on the next date.

In the event the date specified by the day counter is equal to the last date in the specified date range, as determined by decision block 23, decision block 25 is then utilized to determine whether or not the calendar event files for another attendee should be reviewed. If so, logic block 26 indicates the obtaining of the next attendees' calendar event files and block 21 reinitializes the day counter to begin an analysis of this attendee's calendar events throughout the designated date range.

In the event that decision block 22 determines that a schedule does exist for a particular attendee on a designated date that schedule is examined and the first event contained therein is read into a buffer memory, as depicted in block 27. Thereafter, the list of available meeting times and dates is accordingly adjusted, as indicated in block 29.

The construction and adjustment of the "list" of available meeting times and dates is accomplished by establishing an initial period of time equal to all of the available time within the specified date range. This period of time is then subdivided into smaller "windows" in accordance with the events found within each attendee's calendar. The resultant list is a plurality of windows of time, each having a specified beginning time and a specified ending time and a designation of each attendee who is unavailable during that window. Of course, those skilled in the art will appreciate that no two adjacent windows of time within the list will have an identical list of unavailable attendees due to the fact that two such windows would simply be combined into a single window.

By way of illustration, a LIST ADJUSTMENT TABLE demonstrating the adjustment of such a list is depicted below. The TABLE depicts the evolution of an initial list covering a single day to a final list of six windows which incorporate two separate events from the calendar files of two attendees. In this manner, the date range specified by an operator is subdivided into a list of windows, each of which is characterized by a beginning time, an ending time, and a list of unavailable attendees. An examination of the windows in the resultant list can easily be accomplished to determine whether or not a window exists which meets the operator's parameters.

When the end of a prospective attendee's calendar day has been reached, the program logic returns to decision block 23 to determine whether or not the next date or attendee should be examined.

After this process has occurred for each day and each attendee and the day counter indicates that the date examined is the last date in the range, logic block 31 then examines the resultant list of windows to determine which entries meet each parameter specified by the operator. Decision block 32 is then utilized to determine whether or not the list contains any entry which meets all of the operator's parameters. If such entries exist, the program logic continues the logic sequence as indicated in FIG. 6.

In accordance with a key aspect of the present invention, in those cases in which no list entry meets all of the parameters for the meeting specified by the operator, logic block 33 is utilized to find all list entries wherein all attendees are available and the available time span is equal to or greater than seventy-five percent of the desired time span. Those skilled in the art will appreciate that the seventy-five percent level is a design criterion selected by the Applicant and may be varied upward or downward as desired for a particular application.

Next, the meeting parameters may also be automatically altered or relaxed by finding all list entries wherein the available time span is greater than or equal to the desired time span and a maximum number of attendees is available for the meeting. This is indicated by logic block 34. After accomplishing the foregoing alteration of meeting parameters, decision block 35 is utilized to determine whether or not there exists any list entries which comply with the altered list of parameters. If so, the logic sequence continues as indicated in FIG. 5, if not, logic block 36 is utilized to prompt the user to expand the date range or reduce the desired time span in order to find date and time span parameters which may be met. Thereafter, this portion of the logic flow diagram will end. While the depicted embodiment of the present invention demonstrates the relaxing of

| LIST ADJUSTMENT TABLE | | | | |
| --- | --- | --- | --- | --- |
| List Number | Start | Stop | Unavailable | Event Added |
| 1 | 8:00 AM - | 5:00 PM | — | — |
| 2 | 8:00 AM - | 12:00 PM | — | |
| | 12:00 PM - | 1:00 PM | Attendee #1 | Attendee #1 Lunch |
| | 1:00 PM - | 5:00 PM | — | 12-1 |
| 3 | 8:00 AM - | 12:00 PM | — | |
| | 12:00 PM - | 1:00 PM | Attendee #1 | |
| | 1:00 PM - | 2:00 PM | — | Attendee #1 Meeting |
| | 2:00 PM - | 5:00 PM | Attendee #1 | 2-5 |
| 4 | 8:00 AM - | 11:00 AM | — | |
| | 11:00 AM - | 12:00 PM | Attendee #2 | |
| | 12:00 PM - | 1:00 PM | Attendee #1 Attendee #2 | Attendee #2 Lunch 11-1 |
| | 1:00 PM - | 2:00 PM | — | |
| | 2:00 PM - | 5:00 PM | Attendee #1 | |
| 5 | 8:00 AM - | 11:00 AM | — | |
| | 11:00 AM - | 12:00 PM | Attendee #2 | |
| | 12:00 PM - | 1:00 PM | Attendee #1 Attendee #2 | |
| | 1:00 PM - | 2:00 PM | — | Attendee #2 Meeting |
| | 2:00 PM - | 3:00 PM | Attendee #1 Attendee #2 | 2-3 |
| | 3:00 PM - | 5:00 PM | Attendee #1 | |

Next, decision block 30 is utilized to determine whether, or not the end of the day being examined has been reached in the prospective attendee's calendar. If not, the next event is read and the process is repeated.

attendee and time span parameters, those skilled in the art will appreciate that it is also possible to "altered" the date range parameter by expanding the date range by a selected amount.

Next, with reference to FIG. 6, there is depicted a second portion of the detailed program logic referred to in FIG. 5. After a list of meeting options which meet each of the operator's meeting parameters, or the relaxed parameters, has been assembled and built into a list within a suitable buffer memory in the computer, a list pointer is initialized, as indicated by logic block 50. Next, a determination is made by logic sequence 51 as to whether the number of entries from the list pointer to the end of the list is too large to display on a single screen. Those skilled in the art will appreciate that the single screen referred to is that depicted in FIG. 2. If the resultant list will fit on a single screen, the meeting option list depicted in FIG. 2 is filled with the remainder of the entries in the list, and any lines remaining on the screen are set to be protected. This technique is utilized in order to prevent the operator from keying in an "X" on a line where no meeting option exists. This is illustrated by logic block 52. If there are too many entries to fit on a single screen, then, as indicated by logic block 53, the screen of FIG. 2 is filled with as many list entries as is possible.

Once the meeting option list screen of FIG. 2 has been built with list entries, it is displayed to the operator. This is depicted by block 54. Next, a series of logic sequences are performed to determine what the operator has requested. Logic sequence 55 determines whether or not the operator has requested a display of the next screen of entries. If so, a determination is made by logic sequence 56 as to whether the screen currently being displayed shows the operator the last list entry. If there is not another screen of entries to display to the operator, the same screen is then re-displayed, and processing continues at block 54. If there are more entries to show the operator, the list pointer is incremented by the number of entries which can be displayed on a single screen, as indicated by block 57, and processing continues beginning with logic sequence 51.

The processing for the operator's request for the previous screen is very similar. If it is determined by logic sequence 58 that the operator has requested a viewing of the previous screen of list entries, a determination is performed by logic sequence 59 as to whether the user is currently viewing the first screen of entries. If so, the screen is re-displayed and the processing continues at block 54. If there is a screen of previous list entries, then the list pointer is decremented by the number of list entries that will fit on the screen. This is indicated by block 60, and processing continues at block 53.

If the operator has not entered a request to view the next or the previous screen of list entries, a determination is made as to whether the operator has made a request to restart the search. This is performed by logic sequence 61. If the programmable function key associated with this request is depressed, the prompting screen of FIG. 1 is then re-displayed for a change in data, and the search for an appropriate meeting date and time begins again. This is indicated by block 62. If no such request has been made, logic sequence 63 determines whether the operator has requested assistance in making a choice on the screen of FIG. 2. If this has been requested, a screen of information is displayed explaining the use of the screen of FIG. 2. This is depicted by logic block 64. Once this explanatory information has been read, processing continues at block 54.

If none of the alternatives discussed in the previous paragraphs correspond to the operator's request, a determination is made as to which entry the operator has chosen from the list. This process, represented by block 65, scans the "CHOICE" column of the list entries until it finds where the operator has keyed in an "X". Logic sequence 66 is then utilized to determine if the operator has keyed in invalid times under the "STARTING" or "ENDING" columns for the chosen entry. Keying here would be to reduce the duration of the meeting from the maximum permitted during the available time. If the times are not valid, the operator is informed of the error, as indicated by block 67, and processing continues at block 54. If the selected times are valid, logic sequence 68 determines whether the operator has keyed in a time under the "STARTING" column for the chosen entry that is earlier than the original starting time shown for this entry. If it is before the original starting time, a message is displayed to the operator indicating an error, as illustrated by block 69, and processing continues at block 54.

In the alternative, a determination is performed by logic sequence 70 as to whether the user has keyed in a time under the "ENDING" column for the chosen entry that is later than the original ending time shown for this entry. If so, the same operations described above are performed. The operator is informed of the error, as indicated by block 69, and processing continues at block 54.

If the times entered by the operator are within the proper range, the operator is then prompted for the location and purpose of the meeting, is indicated by block 71. Reference is again made to FIG. 3 for a representation of the notification screen which includes such prompts.

In summary, a unique method of scheduling a meeting among keyboard/display terminal users is provided in order to impart flexibility to the process of, and reduce the time normally expended in, arranging a meeting and notifying attendees.

The method of the present invention utilizes daily schedules which are built by keying in a date, a start time, an end time, and information related to the keyed in time such as an event description. These daily schedules are typically called to screens by terminal operators to remind them of upcoming events. The method of the present invention first prompts the operator desiring to schedule a meeting by providing a prompting screen which may be filled in by keying in desired date and time ranges. Upon completion of the keying, the screen contents are then compared with the prospective attendees' daily schedules. This comparison is made to ascertain times when all prospective attendees have no scheduled events. If, as a result of the comparison, there are no available times and dates when the meeting can be held, the method of the present invention then automatically and selectively alters the meeting parameters selected by the operator in order to present the operator with an alternate list of meeting options which approximate the requirements entered by the operator. In this manner, the manual alteration of these parameters by the operator is eliminated and the system automatically presents the operator with a series of prospective meeting dates and times which will meet some or all of the operator's requirements.

While the invention has been particularly shown and described with reference to a preferred embodiment, it will be understood by those skilled in the art that various changes in form and detail may be made therein without departing from the spirit and scope of the invention.

What is claimed is:

1. A method of scheduling a meeting using attendee calendars stored in a computer system, said method comprising the steps of:

presenting a scheduler with a prompting screen for keying in a plurality of desired meeting parameters including at least: a list of desired attendees, a desired date range, and a desired time span;

establishing an initial period of time equal to all available time within said desired date ranges;

comparing in said computer system said initial period of time with each desired attendees' calendar;

in response to said comparing, subdividing said initial period of time into a plurality of shorter periods of time, each of said shorter periods of time have a specified beginning time, a specified ending time and a designation of any desired attendee who is unavailable during that shorter period of time; and presenting an option screen to said scheduler displaying available times for selection of a meeting time within one of said plurality of shorter periods of time which complies with said desired meeting parameters.

2. The method of scheduling a meeting using attendee calendars store din a computer system according to claim 1, further including the step of automatically altering at least one of said plurality of desired meeting parameters in response to the nonavailability of a meeting time complying with all of said desired meeting parameters and presenting an option screen to said scheduler displaying optimum meeting times within one or more of said plurality of shorter periods of time which comply with said altered meeting parameters.

3. The method of scheduling a meeting according to claim 1 wherein said step of presenting a scheduler with a prompting screen further includes presenting a screen for keying a in a meeting location and said step of comparing includes comparing said desired date range and said desired time span with a calendar for said location.

4. The method of scheduling a meeting according to claim 1 wherein said step of presenting an option screen includes providing said scheduler the ability of select an exact meeting time.

5. The method of scheduling a meeting according to claim 4 further including the step of notifying each attendee of said meeting.

6. The method of scheduling a meeting according to claim 5 further including presenting a notification screen to said scheduler for keying in a purpose of said meeting, said step of notifying including notifying each attendee of said purpose of said meeting.

7. The method of scheduling a meeting according to claim 1 further including presenting a notification screen to said attendees with a date and time of a selected meeting filled in form said option screen based upon said scheduler's selection from said option screen.

* * * * *

UNITED STATES PATENT AND TRADEMARK OFFICE
CERTIFICATE OF CORRECTION

PATENT NO. : 5,050,077

DATED : Sept. 17, 1991

INVENTOR(S) : James P. Vincent

It is certified that error appears in the above-identified patent and that said Letters Patent is hereby corrected as shown below:

On the title page and Column 1, line 1
In the title, please change "SCHEDULAR" to --SCHEDULER--.

Signed and Sealed this

Twenty-sixth Day of October, 1993

Attest:

BRUCE LEHMAN

Attesting Officer

Commissioner of Patents and Trademarks